United States Patent [19]
Moyer

[11] Patent Number: 5,765,217
[45] Date of Patent: Jun. 9, 1998

[54] METHOD AND APPARATUS TO PERFORM BUS REFLECTION OPERATION USING A DATA PROCESSOR

[75] Inventor: William C. Moyer, Dripping Springs, Tex.

[73] Assignee: Motorola, Inc., Schaumburg, Ill.

[21] Appl. No.: 749,881

[22] Filed: Nov. 15, 1996

Related U.S. Application Data

[63] Continuation of Ser. No. 396,939, Mar. 1, 1995, abandoned.

[51] Int. Cl.⁶ .................... G06F 12/10; G06F 9/22
[52] U.S. Cl. .................... 711/217; 711/211; 395/200.01; 395/280; 395/182.03; 395/288; 395/841; 395/290
[58] Field of Search .................... 395/200.01, 200.05, 395/280, 287, 290, 292, 311, 308, 421.01, 800.4, 182.03, 288, 841

[56] References Cited

U.S. PATENT DOCUMENTS

| | | | |
|---|---|---|---|
| 5,086,407 | 2/1992 | McGarity et al. | 395/841 |
| 5,127,089 | 6/1992 | Gay et al. | 395/288 |
| 5,146,592 | 9/1992 | Pfeiffer et al. | 395/344 |
| 5,448,719 | 9/1995 | Schultz et al. | 395/182.03 |

OTHER PUBLICATIONS

Motorola, Inc.; "MC68302 Integrated Multiprotocol Processor User's Manual; Second Edition;" 1991; Section: System Integration Block (SIB); pp. 3-1 through 3-75.

*Primary Examiner*—David K. Moore
*Assistant Examiner*—Than V. Nguyen
*Attorney, Agent, or Firm*—Susan C. Hill

[57] ABSTRACT

Method and apparatus for performing bus reflection operation using a data processor (10). The present invention allows a multiplexed peripheral bus master (16) to interface with non-multiplexed peripherals (12, 14) by using a data processor (10) to reflect an address value from the data bus (20) to the address bus (18), or alternately, from the address bus (18) to the data bus (20). In one embodiment, external bus master (16) provides the reflect request signal (30) to data processor (10), and in response, data processor (10) receives the address value provided by external bus master (16) on data bus (20) and drives this same address value on address bus (18) to memories (12, 14). In addition, the present invention allows an external bus master (16) to use the handshake circuitry (50) on data processor (10) to interface with peripheral devices (12,14).

18 Claims, 3 Drawing Sheets

METHOD AND APPARATUS TO PERFORM BUS REFLECTION OPERATION USING A DATA PROCESSOR

This application is a continuation of prior application Ser. No. 08/396,939, filed on Mar. 1, 1995 now abandoned.

REFERENCE TO RELATED APPLICATIONS

The present application is related to the following U.S. patent applications:

"Method And Apparatus For Performing Multiplexed and Non-multiplexed Bus Cycles In A Data Processing System", invented by Oded Yishay et al, having Ser. No. 08/158,584, filed Nov. 29, 1993, and assigned to the assignee hereof;

"Method And Apparatus In A Data Processing System For Selectively Inserting Bus Cycle Idle Time", invented by Oded Yishay et al, having Ser. No. 08/158,575, filed Nov. 29, 1993, and assigned to the assignee hereof; and "Integrated Circuit Microprocessor With Chip Select Logic", invented by James B. Eifert et al., having Ser. No. 07/432,423, filed Nov. 6, 1989, and assigned to the assignee hereof, which is expressly incorporated by this reference.

FIELD OF THE INVENTION

The present invention relates in general to a data processor, and more particularly to a method and apparatus to perform bus reflection operation using a data processor.

BACKGROUND OF THE INVENTION

A data processor, such as a microcomputer integrated circuit, is used with a wide range of peripheral devices, for example memory integrated circuits and application specific integrated circuits (ASICs). Some peripheral devices use multiplexed address and data busses, and some peripheral devices use non-multiplexed address and data busses. In addition, some peripherals may act only as bus slaves, while other peripherals may act as either bus slaves or bus masters.

In this document, the term "multiplexed" means that there is one set of bus conductors which are used as both the address bus conductors and the data bus conductors. During a first portion of a bus cycle, address signals are transferred across the conductors and the conductors are being used as an address bus. During a second portion of a bus cycle, data signals are transferred across the conductors and the conductors are being used as a data bus. Thus for a multiplexed bus, the function of the bus conductors is time multiplexed between a plurality of functions.

SUMMARY OF THE INVENTION

One embodiment of the present invention is a method and apparatus for performing bus reflection operation using a data processor which allows a multiplexed peripheral bus master to interface with non-multiplexed peripherals by using the data processor to reflect an address value from the data bus to the address bus, or alternately, from the address bus to the data bus. In one embodiment, an external bus master provides the reflect request signal to data processor, and in response, the data processor receives the address value provided by external bus master on data bus and drives this same address value on address bus to memories. In addition, the present invention allows an external bus master to use the handshake circuitry on data processor to interface with peripheral devices.

One embodiment of the present invention is a method for operating a data processing system, which includes receiving a non-arbitration bus reflection request signal at an input terminal of a data processor. The non-arbitration bus reflection request signal is provided from external to the data processor. If the non-arbitration bus reflection request signal is asserted and the data processor does not have mastership of an external address bus and the data processor does not have mastership of an external data bus, the data processing system initiates a non-arbitration bus reflection at a plurality of data bus terminals and a plurality of address bus terminals of the data processor. The data processor then receives an address value at the plurality of data bus terminals of the data processor, the address value being provided from external to the data processor, and performs non-arbitration bus reflection by transferring the address value from the plurality of data bus terminals to the plurality of address bus terminals. The data processing system provides the address value external to the data processor by way of the plurality of address bus terminals.

Thus, one embodiment of the present invention allows for a "glueless" data processing system having one or more external bus masters, each of which may not have flexibility consistent with the data processor in terms of the types of devices to which each external bus master is capable of interfacing. By using the data processor as a third party in performing these accesses, glue logic may be eliminated from data processing systems. Thus, one embodiment of the present invention allows the flexibility of designing external bus masters with multiplexed address/data interfaces which can gluelessly interface to devices operating in a non-multiplexed mode.

In this document, the term "non-multiplexed" means that there is a first set of bus conductors which are used as the address bus conductors; and there is a second set of bus conductors which are used as the data bus conductors. Thus during each bus cycle, the address signals can be transferred across the address bus conductors at the same time the data signals can be transferred across the data bus conductors.

In selecting whether to use a multiplexed bus or a non-multiplexed bus, there is a trade-off between speed and cost. Generally, a non-multiplexed bus can transfer more information during a predetermined number of bus cycles because both the address signals and the data signals can be transferred in parallel across separate conductors. However, a non-multiplexed bus requires more conductors, which may add a significant cost.

Many memory devices require use of a non-multiplexed bus. The non-multiplexed bus allows the memory device to provide a faster access time and thus better performance. On the other hand, however, a significant number of ASICs require use of a multiplexed bus. The multiplexed bus allows the ASICs to reduce the number of conductors required, and thus reduce the cost.

A problem arises, however, when a designer wishes to include both non-multiplexed peripherals (e.g. fast memories) and multiplexed peripherals (e.g. inexpensive ASICs) in the same data processing system, where one or more of the multiplexed peripherals is capable of acting as a bus master. When a multiplexed peripheral acts as a bus master, it may need to access the non-multiplexed peripherals. At the present day, "glue logic" must be inserted between the multiplexed peripheral bus master and the non-multiplexed peripherals in order to perform the required multiplexing and buffering of the address and data busses. However, for some applications, the extra cost or space required by the "glue logic" may be a significant problem. In addition, the multiplexed peripheral bus master requires extra circuitry to generate and interpret the handshake signals required to be a bus master.

DESCRIPTION OF THE PREFERRED EMBODIMENTS

Figure 1:
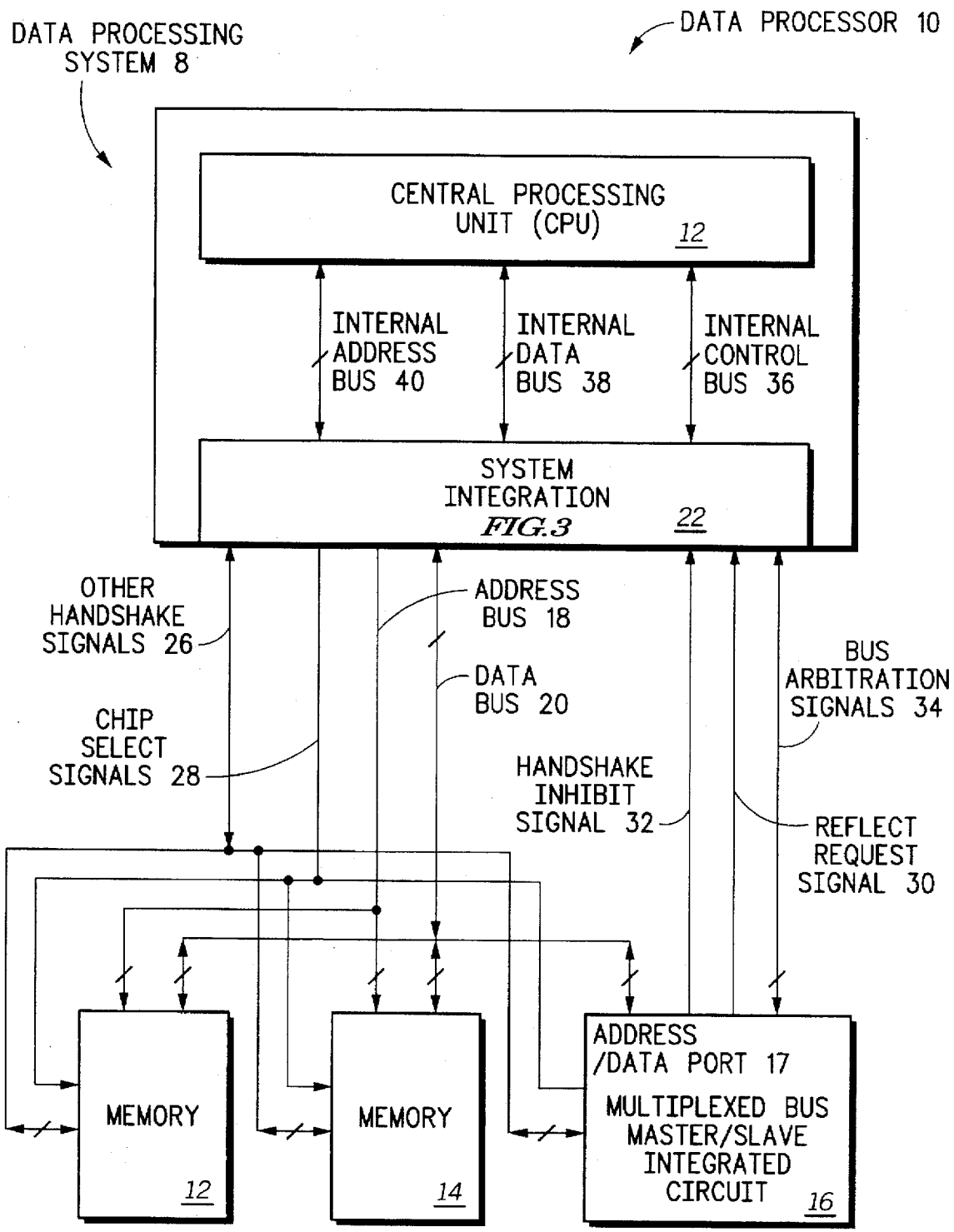
FIG. 1 illustrates, in block diagram form a data processing system 8 in accordance with one embodiment of the present invention.

Referring to FIG. 1, the present invention allows a multiplexed peripheral bus master (e.g. 16) to interface with non-multiplexed peripheral devices (e.g. 12 and 14) by way of a data processor (e.g. 10). The present invention minimizes or eliminates the need for "glue logic" between the multiplexed peripheral bus master (e.g. 16) and the non-multiplexed peripheral devices (e.g. 12 and 14).

Referring to FIG. 1, in one embodiment of the present invention, the multiplexed peripheral bus master 16 provides a reflect request signal 30 to a data processor 10 to indicate that the data processor 10 should receive the address value provided by the multiplexed peripheral bus master 16 by way of data bus 20, and should "reflect" the received address value by providing the received address value to the appropriate non-multiplexed peripheral device (e.g. 12 or 14) by way of address bus 18. Thus, when multiplexed peripheral bus master 16 asserts the reflect request signal 30 and provides an address value on data bus 20, data processor 10 responds by receiving the address value from data bus 20 and by driving address bus 18 with that same received address value. As a result, non-multiplexed peripherals 12 and 14 receive an address value indirectly from multiplexed bus master 16 by way of data bus 20, data processor 10, and address bus 18, and receive a data value directly from multiplexed bus master 16 by way of data bus 20.

In one embodiment of the present invention, multiplexed peripheral bus master 16 also provides a handshake inhibit signal 32 to data processor 10. If the handshake inhibit signal 32 is asserted by multiplexed bus master 16, then data processor 10 determines that it should not provide handshake signals. However, if the handshake inhibit signal 32 is not asserted (i.e. remains negated) by multiplexed peripheral bus master 16, then data processor 10 determines that it should provide handshake signals to the peripheral device (e.g. 12 or 14) which corresponds to the address value provided by the multiplexed peripheral bus master 16 on data bus 20. Thus by negating or asserting the handshake inhibit signal 32, multiplexed peripheral bus masters (e.g. 16) can enable or inhibit data processor 10 from providing handshake signals.

Thus a data processing system 8 or 9 may include both multiplexed peripheral bus masters (e.g. 16) which are capable of providing handshake signals, as well as multiplexed peripheral bus masters which are not capable of providing handshake signals. If a multiplexed peripheral bus master is capable of providing handshake signals, that multiplexed peripheral bus master need only assert the handshake inhibit signal 32 to prevent data processor 10 from providing handshake signals. If a multiplexed peripheral bus master is not capable of providing handshake signals, that multiplexed peripheral bus master need do nothing other than assert the reflect request signal 30 in order for data processor 10 to provide handshake signals.

Figure 3:
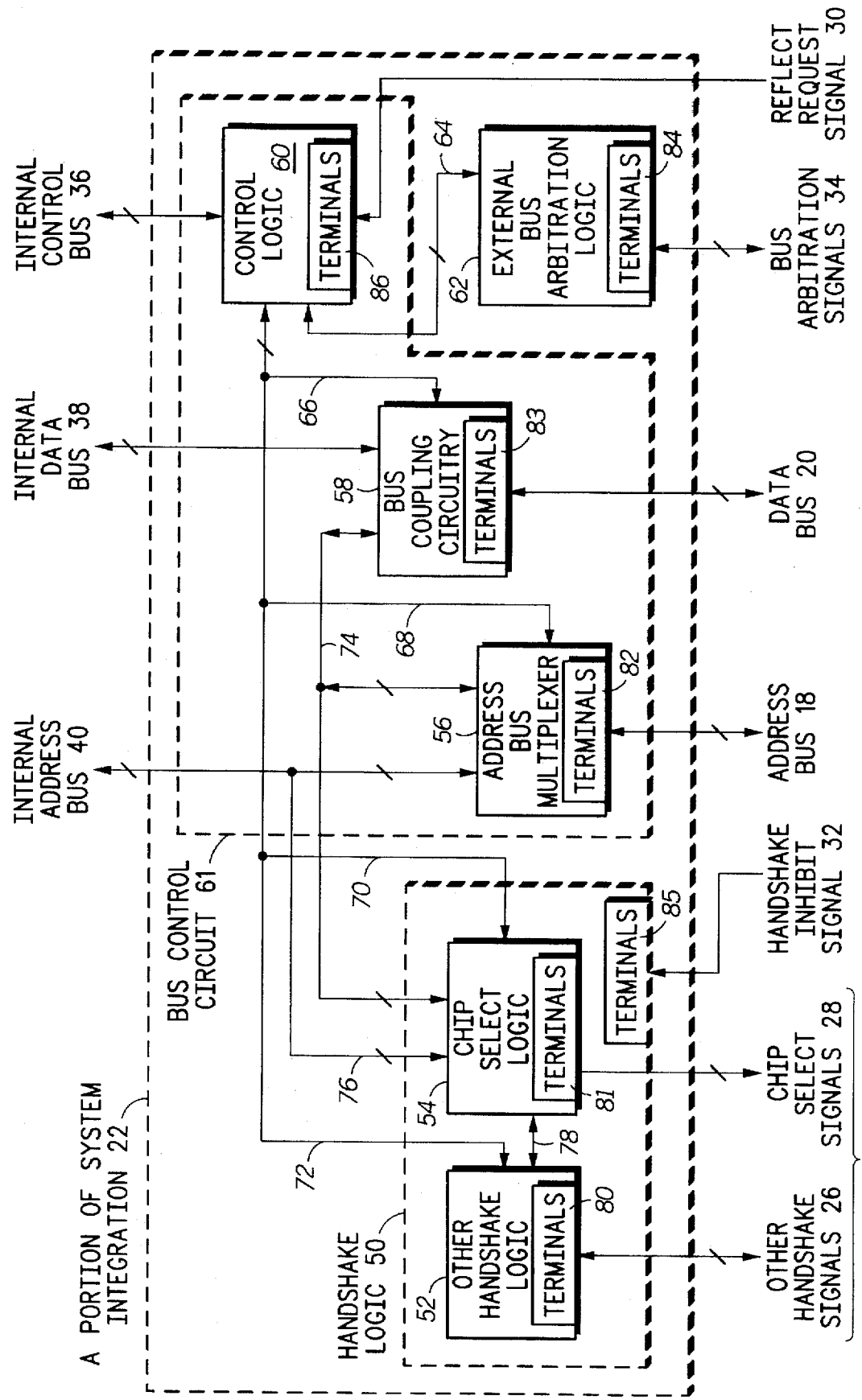
FIG. 3 illustrates, in block diagram form, a portion of system integration circuitry 22 of FIG. 1 and FIG. 2 in accordance with one embodiment of the present invention.

In the embodiment of the present invention illustrated in FIG. 3, the handshake signals which may be inhibited are the chip select signals 28 and the other handshake signals 26. Some embodiments of the present invention have no handshake signals, some embodiments have only chip select signals 28, some embodiments have only other handshake signals 26 (e.g. row address strobe and column address strobe for dynamic random access memories), and some embodiments have a combination of chip select signals 28 and other handshake signals 26.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

DESCRIPTION OF THE FIGURES

FIG. 1 illustrates a data processing system 8 having a data processor 10, a memory 12, a memory 14, and a multiplexed bus master/slave integrated circuit 16. Memories 12 and 14 may be any type of memory device.

Multiplexed bus master/slave integrated circuit 16 may be any type of integrated circuit that is capable of asserting bus mastership of data bus 20 and address bus 18. Multiplexed bus master/slave integrated circuit 16 may be referred to as an external bus master because it is "external" to data processor 10 and because it is capable of being a bus master of address bus 18 and data bus 20. Alternately, multiplexed bus master/slave integrated circuit 16 may be referred to as a multiplexed peripheral bus master because it is a "peripheral" to data processor 10 and because it is capable of being a bus master of address bus 18 and data bus 20. Note that multiplexed bus master/slave integrated circuit 16 may also be a slave device when data processor 10 has mastership of address bus 18 and data bus 20.

Data processor 10 may be any type of processor. Although multiplexed bus master/slave integrated circuit 16 is illustrated as both a bus master and a bus slave, the present invention is used when the multiplexed bus master/slave integrated circuit 16 is operating as a bus master. Multiplexed bus master/slave integrated circuit 16 will also be referred to as multiplexed bus master 16 and external bus master 16. In the illustrated embodiment of the present invention, multiplexed bus master 16 has a bi-directional address/data port 17 which is used to receive and provide address values and data values to and from data bus 20.

Data processor 10 has a central processing unit (CPU) 12 and system integration circuitry 22 which are bi-directionally coupled by way of internal address bus 40, internal data bus 38, and internal control bus 36. System integration circuitry 22 is coupled to memories 12 and 14 by way of address bus 18. System integration circuitry 22 is bi-directionaly coupled to multiplexed bus master 16 and memories 12 and 14 by way of data bus 20. Multiplexed bus master 16 is bi-directionally coupled to memories 12 and 14 by way of data bus 20 for transferring data values. Multiplexed bus master 16 is bi-directionally coupled to data processor 10 by way of data bus 20 for transferring address values and data values.

Multiplexed bus master 16 is coupled to data processor 10 by way of a reflect request conductor 30 for providing a reflect request signal. Multiplexed bus master 16 is coupled to data processor 10 by way of a handshake inhibit conductor 32 for providing a handshake inhibit signal. Multiplexed bus master 16 is bi-directionally coupled to data processor 10 by way of bus arbitration conductors 34. Data processor 10 and multiplexed bus master 16 are each coupled to memories 12 and 14 by way of chip select signals 28. Data processor 10 and multiplexed bus master 16 are each bi-directionally coupled to memories 12 and 14 by way of other handshake signals 26.

Figure 2:
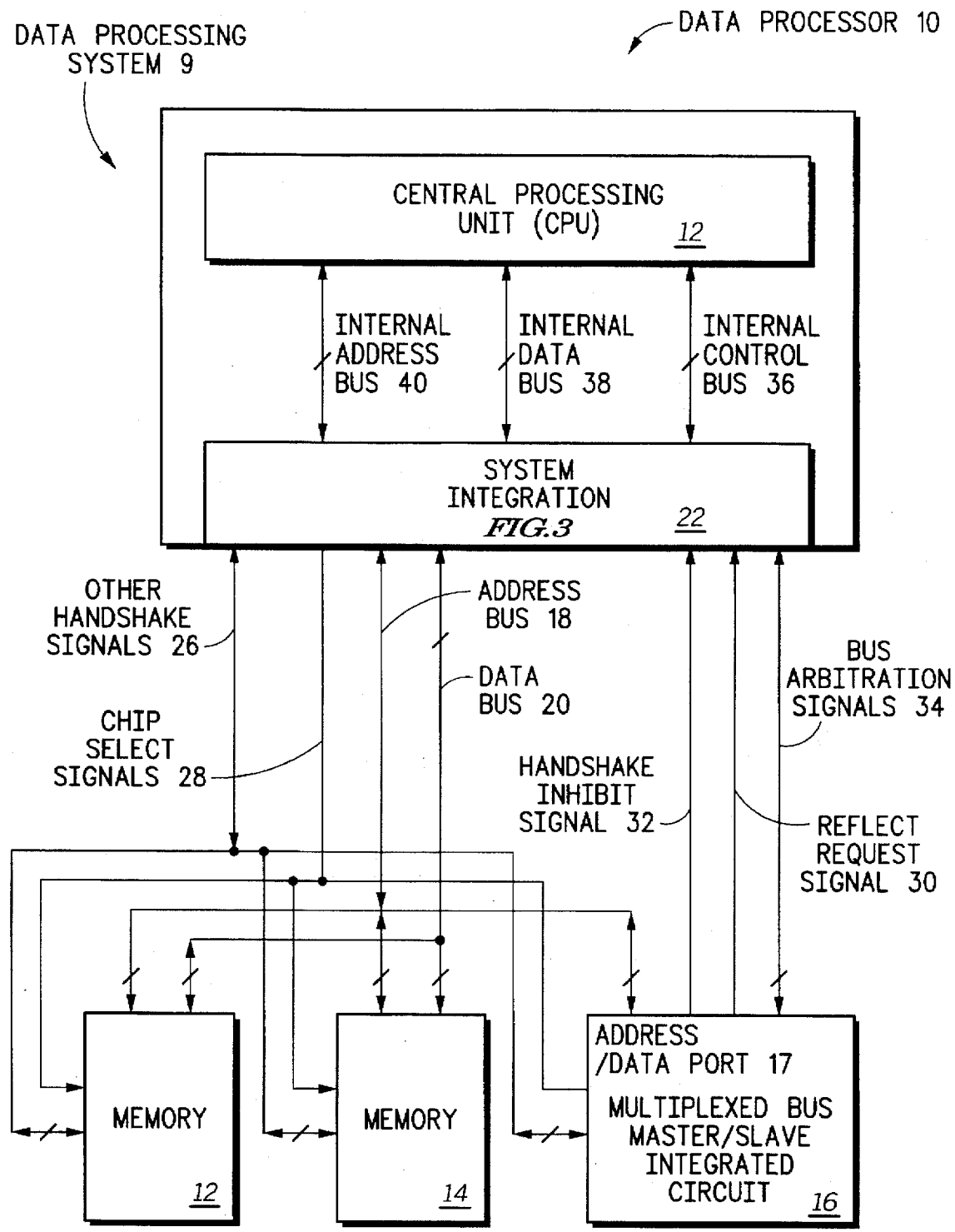
FIG. 2 illustrates, in block diagram form, a data processing system 9 in accordance with an alternate embodiment of the present invention.

FIG. 2 illustrates a data processing system 9 in accordance with an alternate embodiment of the present invention. Data processing system 9 illustrated FIG. 2 is the same as data processing system 8 illustrated in FIG. 1, with one exception. In FIG. 1, the address/data port 17 of the external bus master 16 is coupled to data bus 20; whereas in FIG. 2, the address/data port 17 of the external bus master 16 is coupled to address bus 18, instead of data bus 20.

FIG. 3 illustrates a portion of system integration circuitry 22 having other handshake logic circuitry 52, chip select logic circuitry 54, address bus multiplexer circuitry 56, bus coupling circuitry 58, control logic circuitry 60, and external bus arbitration logic circuitry 62. Handshake logic 50 includes other handshake logic circuitry 52 and chip select logic circuitry 54. Bus control circuit 61 includes address bus multiplexer circuitry 56, bus coupling circuitry 58, and control logic circuitry 60.

Control logic 60 provides control signals to and may receive status information from external bus arbitration logic 62 by way of conductors 64. Control logic 60 provides control signals to and may receive status information from bus coupling circuitry 58 by way of conductors 66. Control logic 60 provides control signals to and may receive status information from address bus multiplexer by way of conductors 68. Control logic 60 provides control signals to and may receive status information from chip select logic 54 by way of conductors 70. And, control logic 60 provides control signals to and may receive status information from other handshake logic 52 by way of conductors 72. Control logic 60 is bi-directionally coupled to internal control bus 36.

Chip select logic 54, address bus multiplexer 56, and bus coupling circuitry 58 are coupled to each other by way of conductors 74. Internal address bus 40 is bi-directionally coupled to chip select logic 54 and address bus multiplexer 56. Internal data bus 38 is bi-directionally coupled to bus coupling circuitry 58.

Control logic 60 is coupled to a reflect request conductor 30 for receiving a reflect request signal from a source external to data processor 10. External bus arbitration logic 62 is bi-directionally coupled to bus arbitration signals 34. Bus coupling circuitry 58 is bi-directionally coupled to data bus 20. Address bus multiplexer 56 is bi-directionally coupled to address bus 18. Handshake logic 50 is coupled to a handshake inhibit conductor 32 for receiving a handshake inhibit signal from external to data processor 10. The handshake inhibit signal 32 is provided to both the chip select logic 54 and to the other handshake logic 52. Chip select logic 54 and other handshake logic 52 are bi-directionally coupled by way of conductors 78. Chip select logic 54 is coupled to chip select conductors 28 for providing chip select signals. Other handshake logic 52 is bi-directionally coupled to other handshake conductors 26 for providing and receiving other handshake signals. Handshake signals 27 include chip select signals 28 and other handshake signals 26.

Terminals 80–86 are any type of structure that is part of data processor 10 and which is used to interface to conductors or devices that are external to data processor 10. For example, terminals 80–81 may be integrated circuit pins, integrated circuit bonding pads, or any other such interface structure. In one embodiment of the present invention, other handshake logic 52 includes terminals 80 for providing and/or receiving other handshake signals 26 to/from external to data processor 10. Chip select logic 54 includes terminals 81 for providing chip select signals 28 external to data processor 10. Address bus multiplexer 56 includes terminals 82 for providing and receiving values from address bus 18. Bus coupling circuitry 58 includes terminals 83 for providing and receiving values from data bus 20. External bus arbitration logic 62 includes terminals 84 for providing and/or receiving bus arbitration signals to/from external to data processor 10. Handshake logic 50 includes one or more terminals 85 for receiving one or more handshake inhibit signals 32 from external to data processor 10. Control logic 60 includes one or more terminals 86 for receiving one or more reflect request signals 30 from external to data processor 10.

OPERATION OF THE PREFERRED EMBODIMENTS

The operation of the present invention will now be discussed. Because data processor 10 may operate as a bus master, data processor 10 includes the circuitry (e.g. handshake logic 50 in FIG. 3) necessary to interface with peripheral devices (e.g. 12 and 14). The present invention allows an external bus master (e.g. 16) to use the handshake circuitry 50 on data processor 10 to interface with other peripheral devices (e.g. 12 and 14).

In addition, referring to FIG. 1, the present invention allows a multiplexed external bus master (e.g. 16) to interface with non-multiplexed peripherals (e.g. 12 and 14) by using data processor 10 to reflect an address value from the data bus 20 to the address bus 18. If external bus master 16 is a multiplexed device, it will provide both data values and address values on data bus 20 in a time multiplexed manner. However, in order to function properly, memories 12 and 14 must receive the address values by way of address bus 18, not data bus 20. Data processor 10 is used by external bus master 16 to transfer or "reflect" the address value from data bus 20 to address bus 18. When external bus master 16 provides the reflect request signal 30 to data processor 10, data processor 10 receives the address value provided by external bus master 16 on data bus 20 and drives (i.e. reflects) this same address value on address bus 18 to one or more of memories 12 and 14.

In alternate embodiments of the present invention, memories 12 and 14 may be any non-multiplexed peripherals. Note that if memories 12 and 14 were multiplexed peripherals, external bus master 16 would be able to transfer address and data values directly to memories 12 and 14 and would not require the use of data processor 10 as an intermediary.

Note that in alternate embodiments of the present invention (see FIG. 2), external bus master 16 may have its address/data port 17 coupled to address bus 18 instead of data bus 20. In this case, external bus master 16, being a multiplexed device, will provide both data values and address values on address bus 18 in a time multiplexed manner. However, in order to function properly, memories 12 and 14 must receive the data values by way of data bus 20, not address bus 18. In this embodiment, data processor 10 is used by external bus master 16 to transfer or "reflect" the data value from address bus 18 to data bus 20. When external bus master 16 provides the reflect request signal 30 to data processor 10, data processor 10 receives the data value provided by external bus master 16 on address bus 18 and drives (i.e. reflects) this same data value on data bus 20 to one or more of memories 12 and 14.

Note however, that if external bus master 16 has its address/data port 17 coupled to address bus 18 and intends to use data processor 10 to provide handshake signals 27, then external bus master 16 may need to also provide the corresponding address value to data processor 10 by way of address bus 18. In some embodiments of the present invention chip select logic 54 may require the corresponding address value in order to determine which one of chip select signals 28 is to be asserted. Also, in some embodiments of the present invention, in response to the address value, chip select logic 54 may provide user programmable control signals to other handshake logic 52 in order to select the behavior of the other handshake signals 26. For a detailed explanation of how user programmable address ranges can be used with chip select signals and other handshake signals, see "Integrated Circuit Microprocessor With Chip Select Logic", invented by James B. Eifert et al., having Ser. No. 07/432,423, filed Nov. 6, 1989, and assigned to the assignee hereof, which has been incorporated by reference herein above.

Referring to FIG. 1, a typical embedded control system (e.g. data processing system 8) may consist of a data processor (e.g. 10) and a variety of external memories (e.g. 12 and 14) and peripheral devices (e.g. 16). Some of the peripherals may be contained in an ASIC device (e.g. 16) that has a multiplexed address/data port 17 due to pin count limitations.

A mix of dynamic random access memory (DRAM), read-only memory (ROM), and static random access memory (SRAM) devices may be present as well. ROM and SRAM interfaces are similar in that they generally require separate address and data buses along with a chip select input. DRAM devices generally require the address bus to be multiplexed with row and column addresses, while the data bus is separate. Row address strobe (RAS) and column address strobe (CAS) control inputs are also generally provided to each DRAM. In alternate embodiments of the present invention, one or more of memories 12 and 14 may be replaced with one or more ASIC devices. The interfaces for these ASIC devices may require either one multiplexed address/data bus, or separate address and data busses. In addition, some ASIC devices may be selected by way of a chip select input signal.

In order to reduce the cost of a data processing system, it is desirable to minimize or completely eliminate the "glue logic" required to interface between different types of integrated circuits (i.e. data processor, various memories, various peripherals). The present invention eliminates the need for external buffers and/or multiplexers. In addition, the present invention allows an external bus master 16 to utilize the chip select logic 54 (see FIG. 3) in data processor 10 to describe the characteristics of a peripheral device which is to be accessed by the external bus master 16 within a particular address range.

Some data processing systems (e.g. 8 in FIG. 1) will want to support one or more external bus masters (e.g. 16). These external bus masters (e.g. 16) may need access to memory (e.g. 12 and 14) and other devices (not shown) in the data processing system 8. Thus, the external bus master 16 would use the same interface operation that is programmed into the chip select registers of data processor 10 in order to interface to the other peripheral devices in data processing system 8. For an example of the chip select features which may be programmed into chip select registers, see "Integrated Circuit Microprocessor With Chip Select Logic", invented by James B. Eifert et al., having Ser. No. 07/432,423, filed Nov. 6, 1989, and assigned to the assignee hereof, which has been incorporated by reference herein above.

The chip select logic 54 and the other handshake logic 52 from data processor 10 may be duplicated in the external bus master 16 at some expense. However, for a low-cost external bus master 16, it may not be feasible to duplicate the chip select logic 54 and the other handshake logic 52 in external bus master 16, particularly if the interface to the external bus master 16 is via a multiplexed bus (e.g. multiplexed address/data port 17 in FIG. 3), and if one or more of the devices being accessed (e.g. memories 12 and 14) are not capable of multiplexed operation, which is the case for many memory devices.

Referring to FIG. 3, the present invention uses a set of data processor terminals 85–86 which receive control signals from an external bus master 16 for the purpose of reflecting the content of the data bus 20 onto the address bus 18, and performing an access for the sake of the external bus master 16. In this mode of operation, the external bus master 16 may then source or sink data from the data bus as a third party in the transfer. The handshake for the access may be handled by the external bus master 16, or may be handled by using the user programmed information in the data processor's chip select registers in chip select logic 54.

Address reflection accesses are initiated by an external bus master 16 once the external bus master 16 gains control of the external buses 18 and 20 via an arbitration process. Referring to the embodiment of the present invention illustrated in FIG. 1, the external bus master 16 initiates an access by driving the desired access address value onto data bus 20, asserting a reflection request signal 30, and optionally driving the other handshake signals 26 with any desired attributes of the access (e.g. size, read/write). The data processor 10 receives this address value at its data bus terminals 83, transfers this received address value from the bus coupling circuitry 58 to the address bus multiplexer 56 and reflects this received address value onto the address bus 18 by way of terminals 82. After driving the data bus 20 with an address value, the external bus master 16 then drives data bus 20 with the corresponding data value for that access. Thus, the peripheral device which is the target of this particular access (e.g. 12 or 14) receives the address value indirectly by way of data bus 20, data processor 10, and address bus 18, while the peripheral device receives the corresponding data value directly from external bus master 16 by way of data bus 20.

In some embodiments of the present invention, the data processor 10 is assumed to control access handshaking, even though the external master 16 has mastership of both address bus 18 and data bus 20 and is the bus master initiating the access. Data processor 10 performs access handshaking by receiving and providing one or more handshake signals 27. Thus, if an external bus master 16 intends to control access handshaking itself, the external bus master 16 needs to assert the handshake inhibit signal 32 during an access in order to indicate to data processor 10 that data processor 10 should not provide any handshake signals 27. If external bus master 16 intends to control access handshaking itself, external bus master 16 needs to receive and provide one or more handshake signals 27, without the aid of data processor 10.

Some embodiments of the present invention use the asserted state of the reflect request signal 30 as an enable to indicate to data processor 10 that data processor 10 should perform a reflection; and consequently, these embodiments of the present invention use the negated state of the reflect request signal 30 as an inhibit to indicate to data processor 10 that data processor 10 should not perform a reflection. However, alternate embodiments of the present invention may instead replace the reflection request signal 30 with a reflection inhibit signal, where the asserted state of the reflect inhibit signal 30 indicates to data processor 10 that data processor 10 should not perform a reflection, and the negated state of the reflect inhibit signal 30 indicates to data processor 10 that data processor 10 should perform a reflection.

Likewise, the handshake inhibit signal 32 may alternately be defined as an enable signal so that its asserted state is an enable, and its negated state is an inhibit. Also, in alternate embodiments of the present invention, the functionality of the reflect request signal 30 and the handshake inhibit signal 32 may be encoded into a plurality of signals. The important idea is that an external bus master (e.g. 16) provides a control input to data processor 10 which causes data processor 10 to perform a reflection. Likewise, the important idea is that the external bus master (e.g. 16) may also optionally provide a control input to data processor 10 which causes data processor 10 to provide and receive handshake signals 27 just as if data processor 10 itself initiated the access.

Data processing system 8 has two devices, namely data processor 10 and external bus master 16, which may take mastership of address bus 18 and data bus 20. Therefore data processor 10 includes external bus arbitration logic 62 and external bus master 16 likewise includes similar external bus arbitration logic (not shown). Data processor 10 and external bus master 16 may arbitrate for mastership of address bus 18 and data bus 20 in any manner. What is important for the present invention, is that data processor 10 be capable of giving up bus mastership to an external bus master (e.g. 16). Some embodiments of the present invention may arbitrate separately for address bus 18 and data bus 20, while some embodiments of the present invention may use the same exchange of signals to arbitrate for both address bus 18 and data bus 20.

Referring to FIG. 3, although the circuitry in system integration 22 may be the same for both data processing system 8 and data processing system 9, the circuitry in system integration 22 functions in a slightly different manner depending upon whether external bus master 16 is coupled to data bus 20 as in FIG. 1, or is coupled to address bus 18 as in FIG. 2. For data processing system 8 in FIG. 1, the address/data port 17 of the external bus master 16 is coupled to data bus 20. Therefore, the external bus master 16 provides an address value to bus coupling circuitry 58 by way of data bus 20. Bus coupling circuitry 58 then provides this same address value to address bus multiplexer 56 by way of conductor 74. Address bus multiplexer 56 then provides this same address value to peripheral 12 or 14, which is external to data processor 10, by way of address bus 18. In additional, bus coupling circuitry 58 also optionally provides this same address value to chip select logic 54 by way of conductor 74.

However, for data processing system 9 in FIG. 2, the address/data port 17 of the external bus master 16 is coupled to address bus 18, instead of data bus 20. Thus, the external bus master 16 provides an data value to address bus multiplexer 56 by way of address bus 18. Address bus multiplexer 56 then provides this same data value to bus coupling circuitry 58 by way of conductor 74. Bus coupling circuitry 58 then provides this same data value to peripheral 12 or 14, which is external to data processor 10, by way of address bus 18. In additional, address bus multiplexer 56 also optionally provides the corresponding address value to chip select logic 54.

Note that for most memory or peripheral accesses, there is one address value and one or more corresponding data values. Thus, for embodiments of the present invention which allow multiple data transfers where external bus master 16 is coupled to address bus 18 (see FIG. 2), data processor 10 may have to reflect multiple data values from address bus 18 to data bus 20 for each address value received on address bus 18. Whereas, for embodiments of the present invention which allow multiple data transfers where external bus master 16 is coupled to data bus 20 (see FIG. 1), data processor 10 only has to reflect one address value from data bus 20 to address bus 18 for each access, since the corresponding multiple data values may be transferred directly from external bus master 16 to the peripheral device by way of data bus 20.

In some embodiments of the present invention, external bus master 16 may convey to data processor 10 the information as to which bus, address bus 18 or data bus 20, is coupled to external bus master 16. For example, one specific timing of the assertion of the reflect request signal 30 by external bus master 16 may indicate to data processor that external bus master 16 is coupled to data bus 20, and thus data processor 10 should reflect the address value from data bus 20 to address bus 18. Likewise, a different timing of the assertion of the reflect request signal 30 by external bus master 16 may indicate to data processor 10 that external bus master 16 is coupled to address bus 18, and thus data processor 10 should reflect the data value from address bus 18 to data bus 20. Alternately, data processor 10 may include a user programmable register bit which may be programmed to provide data processor 10 with the information as to which bus, address bus 18 or data bus 20, is coupled to external bus master 16.

Thus, the present invention allows for a "glueless" data processing system (e.g. 8 in FIG. 1 or 9 in FIG. 2) which includes one or more external bus masters (e.g. 16) which may not have the flexibility of data processor 10 in terms of the types of devices to which the external bus master 16 is capable of interfacing. By using the data processor 10 as a third party in performing these accesses, glue logic may be eliminated from data processing systems. The present invention allows the flexibility of designing external bus masters (e.g. 16) with multiplexed address/data interfaces (e.g. 17) which can gluelessly interface to devices operating in a non-multiplexed mode (e.g. 12 and 14).

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the spirit and scope of this invention.

I claim:

1. A method for operating a data processing system, the method comprising the steps of:

receiving a non-arbitration bus reflection request signal at an input terminal of a data processor, the non-arbitration bus reflection request signal being provided from external to the data processor; and if the non-arbitration bus reflection request signal is asserted and the data processor does not have mastership of an external address bus and does not have mastership of an external data bus, performing the following steps;

initiating a non-arbitration bus reflection at a plurality of data bus terminals and a plurality of address bus terminals of the data processor;

receiving an address value at the plurality of data bus terminals of the data processor, said address value being provided from external to the data processor;

performing said non-arbitration bus reflection by transferring said address value from the plurality of data bus terminals to the plurality of address bus terminals; and providing said address value external to the data processor by way of the plurality of address bus terminals.

2. A method as in claim 1, further comprising the step of:
performing bus arbitration to determine mastership of the external address bus and the external data bus;

wherein said step of performing bus arbitration is performed prior to said step of receiving the non-arbitration bus reflection request signal.

3. A method as in claim 1, wherein said step of performing the following steps further comprises the step of:
receiving a second control signal at a second control input terminal of a data processor, the second control signal being provided from external to the data processor.

4. A method as in claim 3, wherein said step of performing the following steps further comprises the step of:
if the second control signal is asserted, providing at least one handshake signal external to the data processor by way of at least one handshake terminal.

5. A method as in claim 3, wherein said step of performing the following steps further comprises the steps of:
providing the address value to chip select generation circuitry; and if the second control signal is asserted, asserting a chip select signal corresponding to the address value and providing the chip select signal external to the data processor by way of a chip select terminal.

6. A method as in claim 1, wherein said step of performing the following steps further comprises the steps of:
providing said address value from a multiplexed bus master integrated circuit to the plurality of data bus terminals by way of the external data bus;

providing said address value from the plurality of address bus terminals to a peripheral device by way of the external address bus; and providing the non-arbitration bus reflection request signal to the input terminal from the multiplexed bus master integrated circuit.

7. A method as in claim 6, wherein said step of performing the following step further comprises the step of:
providing a handshake control signal to a second control input terminal of the data processor from the multiplexed bus master integrated circuit.

8. A method for operating a data processing system, the method comprising the steps of:
receiving a bus reflection request signal at an input terminal of a data processor, the bus reflection request signal being provided from external to the data processor; and if the bus reflection request signal is asserted and the data processor does not have mastership of an external address bus and does not have mastership of an external data bus, performing the following steps;

initiating a bus reflection at a plurality of data bus terminals and a plurality of address bus terminals of the data processor;

receiving a data value at the plurality of address bus terminals of the data processor, said data value being provided from external to the data processor;

transferring said data value from the plurality of address bus terminals to the plurality of data bus terminals; and providing said data value external to the data processor by way of the plurality of data bus terminals.

9. A method as in claim 8, further comprising the step of:
performing bus arbitration to determine mastership of the external address bus and the external data bus prior to receiving the bus reflection request signal.

10. A method as in claim 8, wherein said step of performing the following steps further comprises the step of:
receiving a second control signal at a second control input terminal of a data processor, the second control signal being provided from external to the data processor.

11. A method as in claim 10, wherein said step of performing the following steps further comprises the step of:
if the second control signal is asserted, providing at least one handshake signal external to the data processor by way of at least one handshake terminal.

12. A method as in claim 10, wherein said step of performing the following steps further comprises the steps of:
receiving an address value at the plurality of address bus terminals of the data processor, the address value being provided from external to the data processor;

providing the address value to chip select generation circuitry; and if the second control signal is asserted, asserting a chip select signal corresponding to the address value and providing the chip select signal external to the data processor by way of a chip select terminal.

13. A method as in claim 8, wherein said step of performing the following steps further comprises the steps of:
providing said data value from a multiplexed bus master integrated circuit to the plurality of address bus terminals by way of the external address bus;

providing said data value from the plurality of data bus terminals to a peripheral device by way of the external data bus; and providing the bus reflection request signal to the input terminal from the multiplexed bus master integrated circuit.

14. A method as in claim 13, wherein said step of performing the following steps further comprises the step of:
providing a second control signal to a second control input terminal of the data processor from the multiplexed bus master integrated circuit.

15. A data processor, comprising:
a plurality of address bus terminals;

a plurality of data bus terminals;

an input terminal for receiving a non-arbitration bus reflection request signal, the non-arbitration bus reflection request signal being provided from external to the data processor; and a bus control circuit, coupled to said plurality of address bus terminals, coupled to said plurality of data bus terminals, and coupled to said input terminal for receiving the non-arbitration bus reflection request signal, wherein if the data processor does not have mastership of an external address bus and of an external data bus, and if the non-arbitration bus reflection request signal is permitting reflection operation, then said bus control circuit receives, from external to the data processor, an address value at the plurality of data bus terminals, said bus control circuit then provides, external to the data processor, said address value by way of the plurality of address bus terminals.

16. A data processor as in claim 15, further comprising:

a second control terminal for receiving a second control signal, the second control signal being provided from external to the data processor;

a chip select terminal; and chip select generation circuitry, coupled to said plurality of address bus terminals and coupled to said chip select terminal, wherein if the data processor does not have mastership of the external address bus and of the external data bus, and if the non-arbitration bus reflection request signal is requesting reflection operation and the second control signal is permitting handshake operation, then said chip select generation circuitry receives the address value and provides, external to the data processor, a chip select signal corresponding to the address value.

17. A data processor as in claim 15, further comprising:

bus arbitration circuitry for determining mastership of the external address bus and the external data bus prior to non-arbitration bus reflection.

18. A data processor as in claim 15, wherein said bus control circuit comprises:

data bus coupling circuitry;

address bus coupling circuitry; and control logic, coupled to said data bus coupling circuitry and coupled to said address bus coupling circuitry, said control logic receiving the non-arbitration bus reflection request signal and if the non-arbitration bus reflection request signal is permitting reflection operation, said control logic directs said data bus coupling circuitry to provide said address value from said data bus coupling circuitry to said address bus coupling circuitry.

* * * * *